March 1, 1927.
G. R. PRICE
1,619,155
CHANGEABLE EXHIBITOR
Original Filed Aug. 9, 1921    3 Sheets-Sheet 1
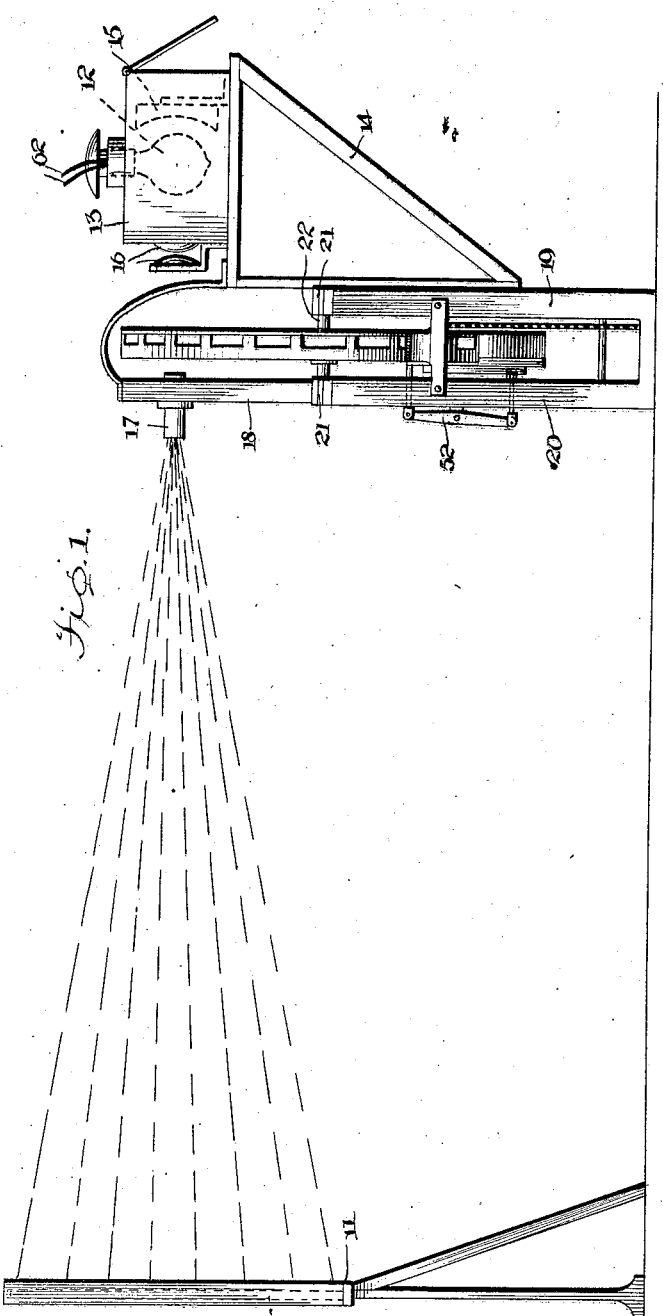
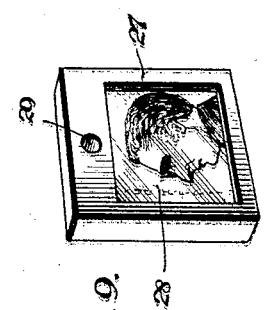
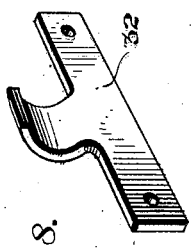
INVENTOR
George R. Price
BY
ATTORNEYS March 1, 1927.
G. R. PRICE
1,619,155
CHANGEABLE EXHIBITOR
Original Filed Aug. 9, 1921   3 Sheets-Sheet 2
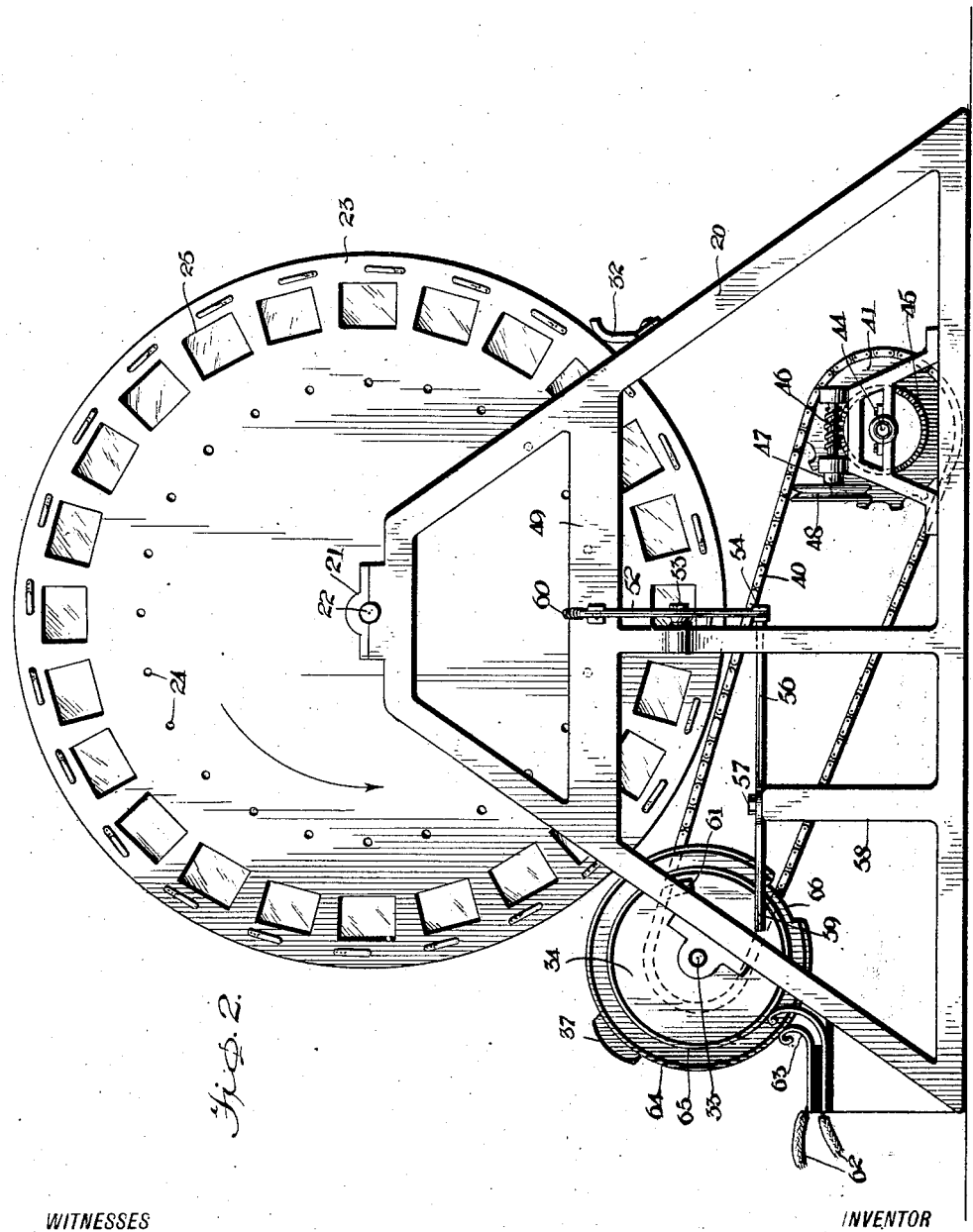
WITNESSES
INVENTOR
George R. Price,
BY
ATTORNEYS March 1, 1927.
G. R. PRICE
1,619,155
CHANGEABLE EXHIBITOR
Original Filed Aug. 9, 1921    3 Sheets-Sheet 3
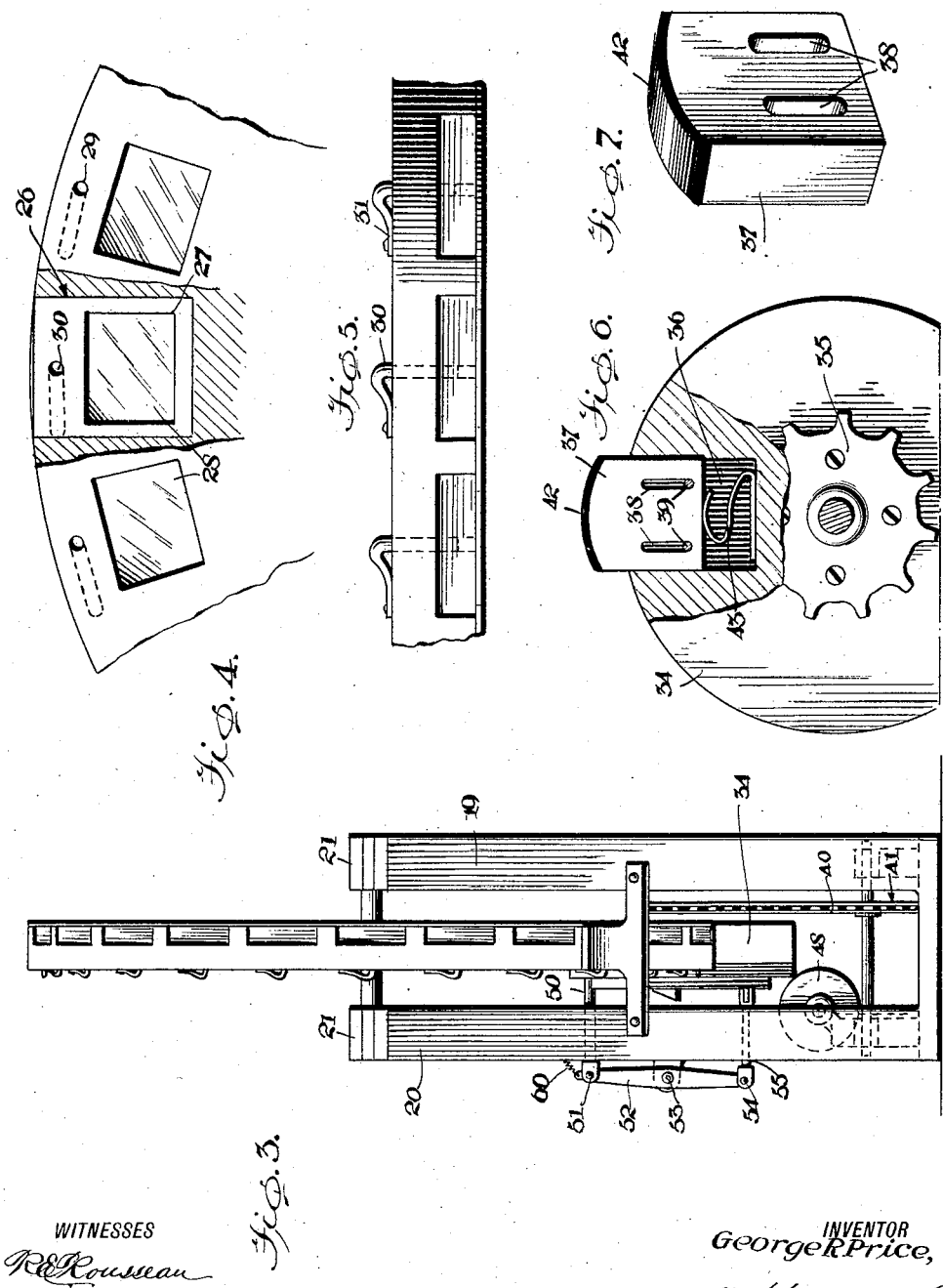
WITNESSES
INVENTOR
George R Price,
BY
ATTORNEYS

Patented Mar. 1, 1927.

1,619,155

UNITED STATES PATENT OFFICE.

GEORGE RICHARD PRICE, OF MONESSEN, PENNSYLVANIA.

CHANGEABLE EXHIBITOR.

Application filed August 9, 1921, Serial No. 490,908. Renewed October 5, 1926.

My present invention relates generally to advertising devices and more particularly to a changeable exhibitor, my object being the provision of an intermittently movable exhibiting device together with means whereby views therefrom may be thrown upon a screen and whereby proper and unfailing operation is insured from connections through a continuously rotating source of power as well as whereby to mask the source of light while change is made from one view to another.

With these general objects in mind my invention resides in the construction, arrangement and operation of parts to be now described with respect to the accompanying drawings, which latter form a part of this specification and wherein, Figure 1 is a side view illustrating the practical application of my invention, Figure 2 is a front elevation of the changeable exhibitor, Figure 3 is a side view thereof, Figure 4 is an enlarged side view of a fragmentary portion of the movable image support, partly broken away and in section, Figure 5 is a plan view of the part shown in Figure 4, Figure 6 is a partial side view, on an enlarged scale, of the intermittent shifter, partly broken away and in section, Figure 7 is a detail perspective view of the friction piece shown in Figure 6, Figure 8 is a detail perspective view of the friction brake, and Figure 9 is a detail perspective view of one of the images in its frame.

Referring now to these figures, my invention proposes an arrangement adapted to project images, for instance for advertising purposes, upon a ground glass or other screen 10, in a frame 11, by means of a light beam, preferably from an electric bulb 12 mounted in a light box 13. The light box is mounted upon a bracket 14, and the beams from the bulb 12 proceed forwardly, by virtue of a rear reflector 15 in the light box, through concentrating lenses 16 at the forward portion of the light box and thence through an image and a projecting lens 17, to the screen 10.

The projecting lens 17 is preferably mounted upon a bracket 18, and the brackets 14 and 18 are respectively connected to and supported by the rear and front uprights 19 and 20 of an exhibitor frame, each of which uprights is in form substantially a truncated triangle, its upper portion supporting a bearing 21 for one end of the axial shaft 22 of an enlarged rotating disk-like wheel 23 which constitutes an intermittently rotating image supporting member.

The disk-like wheel 23 has in its forward face an annular series of small apertures 24, the series being arranged concentric therewith and is also provided with an annular series of large rectangular openings 25 beyond the apertures 24 and also concentric with the shaft 22, the openings 25 extending entirely through the disk or wheel 23 and being in communication with slots 26 whose outer ends open through the periphery of the disk as particularly shown in Figure 4. There is thus provided a plurality of radial peripherally opening pockets in the exhibiting disk or wheel for the reception of a plurality of image frames 27, one of which is shown in Figure 9, and each of which is adapted to hold an image 28 to be exhibited and has an opening 29 so that when inserted in the pocket 26 the opening 29 registers with an opening in the front face of the disk at the same time the image 28 registers with the disk opening 25. In the openings of the disk 23 thus registering with the frame opening 29 there is a latch pin 30 whose outer angular portion has a gooseneck curve and a spring tail 31, the latter secured at its extremity to the disk or wheels 23 so that the pin is movable against the tension of the spring tail when an image frame 27 is inserted into or removed from the respective pocket, and is normally held seated in the opening 29 of the frame to prevent the latter from accidental displacement.

The foregoing construction it will be noted leaves the peripheral edge of the exhibiting disk or wheel 23 substantially smooth, and this edge is engaged by a resilient frictional brake piece 32 attached to and carried by the uprights 19 and 20 as seen in Figures 1 and 2 and shown in detail in Figure 8. The function of this brake is to prevent accidental displacement and overrunning of the friction wheel.

The uprights 19 and 20 also support a shaft 33 at one side, on which an intermittently operating shifter is mounted. This shifter is in the form of a disk 34 having a sprocket wheel 35 secured upon its rear face as seen in Figure 6 and having a radial pocket 36 opening through its periphery adjacent to its rear face for the reception of a friction plug 37 as seen in Figure 7. The plug 37 has longitudinal slots 38 and through these slots are extended guide pins 39 fixed in the rotating disk 34 the latter of which is constantly rotated through a sprocket chain 40 engaging its sprocket wheel 35 and extending from a constantly rotated driven sprocket 41. The friction plug 37 whose outer surface is preferably convexed as at 42, is seated at its inner end against a spring 43 in the pocket 36 and the rotating disk 34 is mounted in such proximity to the intermittently rotating exhibitor wheel 23 that the friction plug 37 yieldingly engages the periphery of the wheel 23 for a portion of each complete rotation of the disk 34.

The constantly driven sprocket 41 is mounted on a shaft 44 in connection with a worm wheel 45, the latter of which is engaged by a worm 46 on a shaft 47 having a pulley 48 which is belt connected in practice to any suitable source of power as for instance an electric motor.

Mounted through a guide opening of a cross bar 49 of the forward upright 20 is a latch pin 50 whose rear end is adapted to extend into the apertures of the series 24 whereby upon engagement in one of these apertures the exhibitor wheel 23 will be held motionless with one of its exhibiting openings 25 alined with the concentrating and projecting lenses 16 and 17. Pin 50 has a movable pivot 51 at its forward end with the upper end of a rocker arm 52, fulcrumed at 53 and having a movable pivot at its lower end at 54 with one end of a connecting arm 55 whose opposite end is pivotally connected to one end of a lever 56.

As shown particularly in Figure 2 the lever 56 is fulcrumed at 57 upon the upper end of a post 58, and its free end 59 is normally held in close proximity to the forward surface of the rotating disk 34 by virtue of a spring 60 connecting the upper extremity of the rocker arm 52 with the forward upright 20, which also serves to normally hold the latch pin 50 in its inner active position.

On the forward face of the disk 34 is a cam or wedge shaped projection 61 which, in the rotation of disk 34, comes into engagement with the free end 59 of lever 56 in each rotation slightly before engagement of the friction plug 37 with the periphery of the wheel 23. Thus at the time of engagement of the friction plug with the exhibitor wheel, lever 56 will have been shifted on its fulcrum 57 to withdraw the latch pin 50 from an aperture 24 of the exhibitor wheel in order that the latter may be freely rotated to position the next successive image in alinement with the concentrating and projecting lenses 16 and 17.

As shown in Figure 1, the light source is preferably in the nature of an electric bulb 12, whose leads 62 connect with brushes 63 supported for flexible yielding engagement with contact rings 64 and 65 of the forward portion of the disk 34, and one of which rings 64 is broken away at a recessed portion 66 of the disk diametrically opposite the plug 37 so that the circuit of the light bulb 12 will thus be broken at the time the exhibitor wheel 23 is being rotated. For the above purpose the disk 34 will be preferably formed of nonconducting material, in order to insulate the rings 64 and 65 from one another, and lighting current from any suitable source may be supplied to the rings 64 and 65 in any suitable manner.

Thus in operation with the parts set up in the position shown in Figure 1 and the images with their frames 27 properly inserted and latched in the peripheral pockets of the exhibitor wheel 23, it will be noted that continuous rotation of the disk 34 serves to bring about partial rotation of the exhibitor wheel at one point in each complete rotation of the disk, namely when the plug 37 yieldingly and frictionally engages the peripheral edge of the wheel. At the time of this engagement the disk projection 61 has functioned to withdraw the latch pin 50, the latter when released being pulled by the spring 60 into engagement with the face of the exhibitor wheel so as to automatically drop into the next succeeding aperture 24 as the wheel is rotated. It will also be noted that at the time the friction plug 37 engages the periphery of the exhibitor wheel 23 for rotation of the latter the lighting circuit of the bulb 12 will be broken so that each rotative movement of the exhibitor wheel 23 will be accomplished in darkness and the result is thus that each successive image of the wheel 23 will be flashed on to the screen 10 and steadily maintained for an appreciable time, and the flashing on and off of the light with the appearance of a new image each time the light is flashed on thus adds to the attractiveness of the display and to the value of the device especially when utilized for advertising purposes.

I claim:

1. A movable exhibitor including an image supporting wheel, means to lock the wheel in stationary position, a constantly rotating disk having a peripheral pocket, a spring controlled friction block yieldable radially within said pocket and normally projecting beyond the disk and engageable with the periphery of the wheel for intermittently rotating the latter, and connections actuated by said disk in its rotation for releasing the wheel previous to each rotative movement.

2. A changeable exhibitor including an intermittently movable wheel having a plurality of images, a constantly rotating disk adjacent to and opposite the peripheral face of the wheel, and a friction member carried by said disk and radially projecting and yieldable with respect thereto for engagement with the said peripheral face of the wheel whereby partial rotation of the image wheel will be induced during each rotation of the disk.

3. In a changeable exhibitor, an image supporting wheel, an intermittently flashing light source adjacent thereto to successively throw a beam of light through the images of the wheel, latch means automatically engageable with the wheel at a point opposite each of its images, to hold the wheel stationary during flashing of the light source, a continuously driven disk having means intermittently and frictionally engageable with the periphery of the wheel to rotate the latter in step by step movements, means carried by the disk to release the latch member prior to each operative engagement of the disk with the wheel, and means also carried by the disk and controlling the flashing of the light source.

GEORGE RICHARD PRICE.